United States Patent [19]

Kurikko

[11] Patent Number: 5,786,813
[45] Date of Patent: Jul. 28, 1998

[54] VIDEO DISPLAY UNIT

[75] Inventor: Jarmo Kurikko, Espoo, Finland

[73] Assignee: ICL Personal System OY, Helsinki, Finland

[21] Appl. No.: 294,429

[22] Filed: Aug. 23, 1994

Related U.S. Application Data

[63] Continuation of Ser. No. 24,639, Mar. 1, 1993, abandoned.

[30] Foreign Application Priority Data

Mar. 2, 1992 [FI] Finland .................. 920935

[51] Int. Cl.⁶ .................................................. G09G 5/00
[52] U.S. Cl. ...................... 345/212; 345/211; 348/633
[58] Field of Search .................................. 345/212, 211, 345/213, 87, 102, 12, 13; 348/633, 634; 364/707

[56] References Cited

U.S. PATENT DOCUMENTS

| | | | |
|---|---|---|---|
| 4,149,110 | 4/1979 | Dallos | 358/219 |
| 4,667,289 | 5/1987 | Yoshida et al. | 364/200 |
| 5,059,961 | 10/1991 | Cheng | 340/720 |
| 5,078,476 | 1/1992 | Shin | 340/814 |
| 5,389,952 | 2/1995 | Kikinis | 345/212 |

FOREIGN PATENT DOCUMENTS

| | | | |
|---|---|---|---|
| 0265209 | 4/1988 | European Pat. Off. | |
| 0 317 072 | 5/1989 | European Pat. Off. | G06F 1/00 |
| 117382 | 9/1980 | Japan . | |
| 168820 | 7/1991 | Japan . | |
| 64-310277 | 7/1991 | Japan | G06F 1/26 |

*Primary Examiner*—Dennis-Doon Chow
*Attorney, Agent, or Firm*—Fitch, Even, Tabin, Flannery

[57] ABSTRACT

The invention relates to a video display unit (10) comprising a built-in power supply (5) and at least one electrically controlled power switch (4) for connecting mains voltage to the power supply. The power switch comprises at least one electrically controlled switch (4). In addition, the display unit comprises a control circuit (6) which closes and opens said at least one switch (4) for switching on and off the display unit in response to the state of at least one video or deflection signal received by the display unit or a command received via a communication channel (9) utilizing the signals of the video interface.

11 Claims, 3 Drawing Sheets

VIDEO DISPLAY UNIT

This is a continuation of application Ser. No. 08/024,639 filed Mar. 1, 1993, now abandoned.

FIELD OF THE INVENTION

The invention relates to a control of a power supply of a video display.

BACKGROUND OF THE INVENTION

Present display units usually have a dedicated power supply connected to the mains voltage. The display unit usually comprises a large power on/off switch in the front panel. However, to improve the ergonomics of the display unit, primarily its ease of use, it would be desirable that the display unit could be automatically switched on at the same time as the central unit is started.

Such display units are also known that share a common power supply with the central unit, and the required operating voltages are supplied to the display unit by separate conductors. In such cases, however, the central unit and the display unit have an interface which is not compatible with the de facto standard interfaces (such as the video interface of a VGA adapter). Accordingly, displays and central units from different manufacturers are not compatible. In addition, the internal temperature of the power supply of the central unit rises due to increased power consumption when the power supply provides the peripheral device. Display units having a common power supply with the central unit are disclosed e.g. in European Patent Application O 317 072 and in the Abstract of Japanese Patent Application 64-310277.

In another type of display units the power cable is connected to the mains voltage output of the central unit, and the power on/off switch of the central unit also turns on the display unit. This approach, however, causes extra costs and there may be problems with the mains interference filter as well as with interferences from mains voltage (EMC interferences). Such a display unit cannot be interfaced to the central units of all manufacturers even though the video interface itself would be compatible. In addition, an additional mains cable and a socket is required in the central unit.

DISCLOSURE OF THE INVENTION

An object of the invention is a display unit with automatic power on/off.

Another object of the invention is to decrease the power consumption of the display unit and reduce the magnetic and electric fields in the surroundings of the cathode-ray tube display.

These objects are achieved by means of a video display unit according to the invention, comprising a built-in power supply;

at least one electrically controlled switch for connecting a mains voltage to the power supply;

a control means which, according to the state of at least one video or deflection signal received by the display unit, controls said at least one switch so as to switch on and off the display unit, respectively, so that no operating voltage is present in the control circuit when the switch is open; and a start-up and holding circuit which is responsive to the reappearance of said at least one video or deflection signal so as to control said at least one switch so that the switch is closed by the energy of said at least one video or deflection signal to activate the power supply and the control means.

The basic idea of the invention is to control the power on/off switch of the display unit by the signals of the video interface of the display unit, preferably deflection signals. For instance, the power of the display unit will be turned off after a predetermined delay has expired from the time when the deflection signal lines became inactive. Correspondingly, the power of the display unit will be turned on when the deflection signals become active. The user need not switch the device on and off manually, which results in more convenient use of the display, i.e. the ergonomics of the display will be improved by the inventive control circuitry with minor additional costs. In certain applications, it may be possible to totally omit the manually operated power switch of the display unit, which reduces costs. In any case the power switch of the display unit need to be used substantially less frequently, and consequently there is no need to have an easy access to the power switch and to place it in the front panel of the display unit. The power switch can be located quite freely, which allows more freedom in the design of the appearance of the display unit. The power switch can be assembled in the part of the display unit where it fits best and where the amount of the wiring required inside the display unit can be minimized, with resulting savings in the manufacturing costs of the display unit.

In the invention, when the display unit is off, no operating voltage is provided for the control circuitry of the power switch. Therefore, the power switch is turned on by the energy of a video or deflection signal when said signal becomes active in the video interface. The turning on of the power switch activates the power supply of the display unit which provides a hold current for the power switch. In this way, the display unit is able to automatically switch into a totally inoperative state wherein no standby power supply, battery or accumulator is needed.

In one embodiment of the invention, the properties of the signals of the video interface, such as the deflection frequency, the duration or polarity of the synchronization pulses, etc., are utilized to turn on and off different circuits in the display unit. Accordingly, when the power switch is on (closed), the circuits having a high power consumption and/or generating magnetic/electric fields, such as the deflection circuits, video amplifiers or the high voltage of the cathode-ray tube may be turned off, depending on the properties of the signals of the video interface, the circuits necessary for fast start-up of the display unit, such as the heating circuit of the cathode of the cathoderay tube, being maintained in operation. As a result the power consumption can be reduced, and electric and magnetic fields in the vicinity of the display unit can be diminished when the display unit is not in active use, while the display unit nevertheless can be switched on without delay. The computer may contain a special program for controlling the display adapter of the computer so that the desired properties of the signals of the video interface can be established. The user may input commands to the control program. Correspondingly, commands sent over a communication path utilizing the signals of a standard video interface can also be used to control the display unit.

BRIEF DESCRIPTION OF THE DRAWINGS

In the following the invention will be described by means of illustrating embodiments with reference to the attached drawings, where.

DETAILED DESCRIPTION OF THE INVENTION

The invention has applications in the control of the power supply of any video display unit including cathode-ray tube displays, liquid crystal displays, plasma displays, electroluminescence displays, etc.

Figure 1:
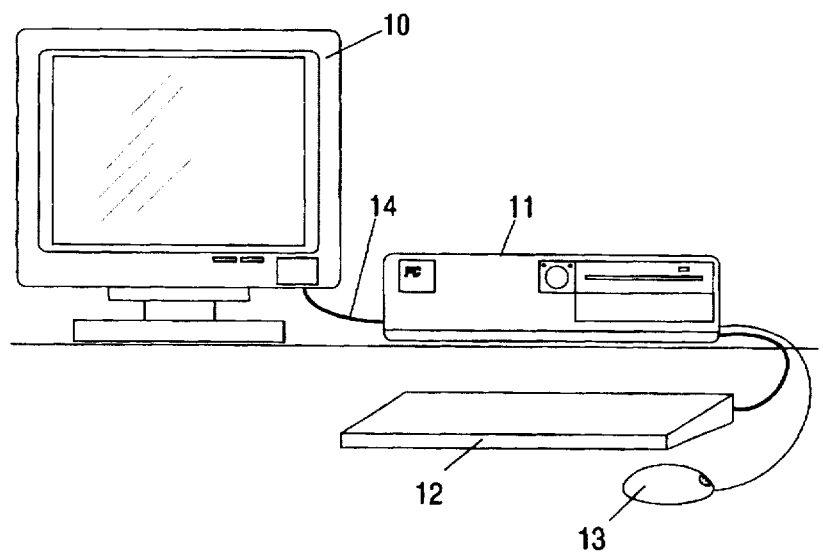
FIG. 1 shows a typical computer system in which the invention can be applied.

FIG. 1 shows a computer system having a display unit in which the invention may be applied. The computer system comprises a central unit 11, to which a keyboard 12, a mouse 8 and a display system with an associated display unit 10 is connected. As is well-known, the central unit of the computer comprises a video display adapter which generates a video signal/video signals applied through a video interface and a video cable 14 to the display unit 10. The invention will be described below referring to specific synchronizing and timing signals (such as HSYNC and VSYNC) of the horizontal and vertical deflection of video signals. All video signals comprise such synchronizing and timing signals in one form or another. However, the number of physical signals in the video interface 14 may vary greatly. For instance, the horizontal and vertical deflection signals may be separate or combined; the video signal may be a composite video signal or an analog or TTL level RGB video signal; the video signal may contain the deflection signals, etc. The invention is applicable in connection with all such various video signal formats and video interfaces. At present the VGA video interface is the most widely used de facto standard for video interfaces.

Figure 2:
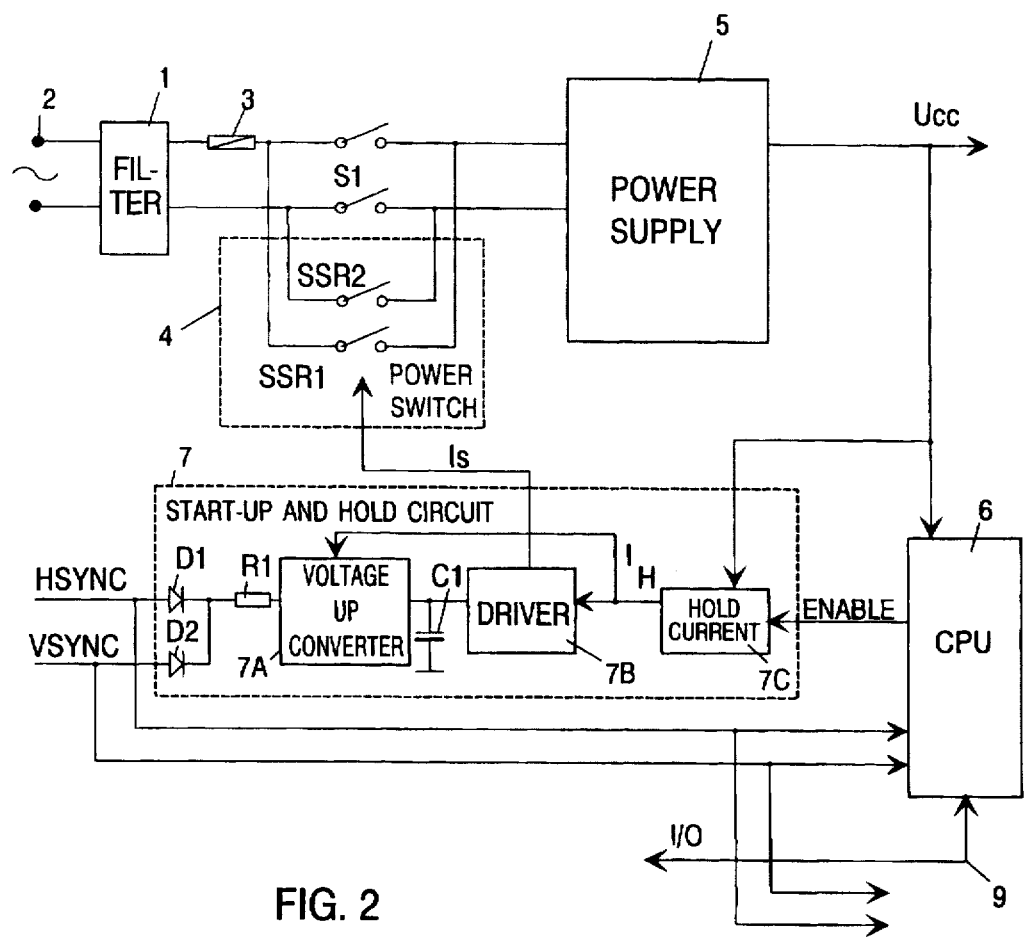
FIG. 2 is a block diagram illustrating the power supply unit of a display unit according to the invention.

FIG. 2 shows a circuit for switching on and off a display 10 according to the invention. Energy required to switch on the device is obtained from the signals of the video interface, preferably from the deflection signals HSYNC and VSYNC. External energy such as mains voltage is not needed to switch on the display unit. The circuit is not particularly suitable for composite video type video interfaces as such interfaces have low energy and voltage levels. On the contrary, the TTL level R, G and B type signals are well suited for use in addition to or in place of the deflection signals HSYNC and VSYNC (the video interface of EGA adapters, for instance).

The power supply unit of FIG. 2 comprises a power supply 5 connected by an electrically controlled power switch 4, a fuse 3, a mains filter 1 and a mains connection 2 to an AC mains voltage, e.g. 220 V. The power switch 4 is controlled electrically by a signal $I_S$ and may be any electronic or electro-mechanical switch meeting the electrical specifications, such as a thyristor, triac, relay or solid-state relay. In the preferred embodiment of the invention, separate solid-state relays SSR1 and SSR2 are used for both the phase conductor and the neutral conductor so as to meet the safety regulations. If required, the display unit may further be provided with a manual power switch S1 in parallel with the electrically controlled power switch 4, so that the device can be switched on manually e.g. in the case of failure.

When the control current $I_S$ is applied to the power switch 4, the power switch is turned on (closed), so that the mains voltage will be connected to the power supply 5. The power supply 5 generates the various operating voltages required in the video display unit, which voltages are represented commonly by a single voltage $U_{cc}$ in FIG. 2. The power supply 5 can be realized by any appropriate power supply design, depending on the application.

The power supply unit of FIG. 2 further comprises a start-up and holding circuit 7 with an associated control unit 6. Operating voltage is supplied to both the start-up and holding circuit 7 and the control unit from the power supply 5. The control unit 6 monitors the deflection signal lines HSYNC and VSYNC in the video interface of the display unit and generates an operation enable signal ENABLE for the start-up and holding circuit 7 when the deflection signals are present. The signal ENABLE activates a hold current circuit 7C so that it enables the passage of a hold current $I_H$ from the power supply 5 to a driver 7B of the power switch 4. The driver 7B derives the drive current $I_S$ for the power switch 4 from the hold current $I_H$. When the control unit 6 detects the absence of the deflection signals HSYNC and VSYNC, it eliminates the control signal ENABLE after a predetermined delay. Due to the absence of the signal ENABLE, the hold current circuit 7C blocks the passage of the hold current $I_H$ to the driver 7B. The removal of the hold current $I_H$ ceases the control current $I_S$, as a result of which the power switch 4 is turned off (opened), and the power supply 5 is disconnected from the mains voltage. Thus, there are no operating voltages in the start-up and holding circuit 7 and the control unit 6, which cannot therefore monitor the deflection signals when the power switch 4 is open. Therefore the energy required to switch on the display unit is derived directly from the deflection signals HSYNC and VSYNC when they reappear.

Figure 3:
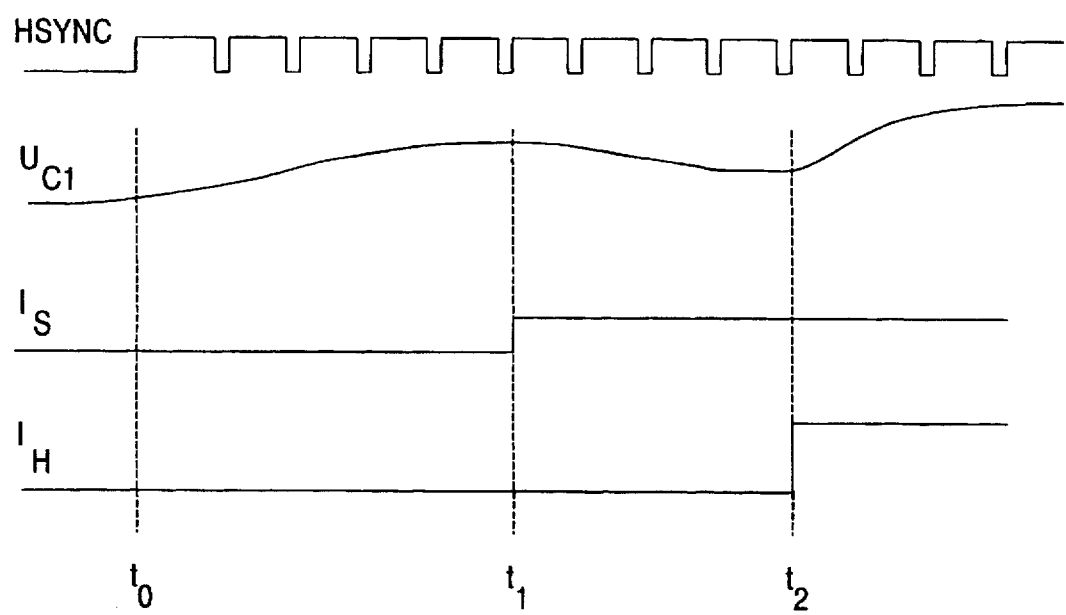
FIG. 3 is a signal diagram illustrating the operation of the start-up and holding circuit of FIG. 2.

For this purpose the start-up and holding circuit 7 of FIG. 2 comprises a rectifier diode D1 and a rectifier diode D2 for the half-wave rectification of the deflection signals HSYNC and VSYNC, respectively, and for charging a capacitor C1 by the rectified signals. As the voltage level of the deflection signals HSYNC and VSYNC is relatively low, a voltage up-converter 7A, such as a voltage doubler, may be provided between the rectifier diodes D1 and D2 and the capacitor so as to obtain a sufficient voltage level for the subsequent circuits. The energy level charged in the storage capacitor C1 is monitored by a comparator circuit in the driver circuit 7B. The comparator circuit outputs a current pulse $I_S$ for closing the power switch 4. The duration of the current pulse $I_S$ is typically at least two mains voltage periods (40–100 milliseconds) in order that the power supply 5 of the display unit would have enough time for start-up and generation of the hold current $I_H$ for the driver 7B and thereby to the power switch 4. The operation of the start-up circuit 7 will be described referring to FIG. 3, in which no horizontal deflection signal HSYNC occurs before a time instant to, as a result of which the voltage $U_{c1}$ of the capacitor C1, the control current $I_S$ and the hold current $I_H$ are zero. The horizontal deflection signal HSYNC reappears at the time instant to and its energy starts to be charged in the capacitor C1, thus increasing the voltage $U_{c1}$ of the capacitor. At a time instant $t_1$ the voltage $U_{c1}$ reaches the threshold voltage of the comparator in the driver circuit 7B so that the driver 7B generates the starting current pulse $I_S$. The starting current pulse $I_S$ closes the switch 4 so that the power supply 5 starts to supply operating voltages to the control unit 6 and the start-up and holding circuit 7. As the control unit 6 is activated, the default state of the signal ENABLE is such that is allows the hold current $I_h$ to be passed freely to the driver 7B to establish a permanent control current $I_S$. Due to the hold current $I_H$ from the power supply 5, the start-up and holding circuit does not load the deflection signals after the start-up and deteriorate the quality of the synch signal pulses (such as the level and rise/fall times of the signals). Immediately after the display unit has been switched on, the control unit 6 starts to monitor the deflection signal lines HSYNC and VSYNC and control actively the hold current $I_H$ by the control signal ENABLE.

In FIG. 2, the control unit 6 may further comprise a data communication channel 9 for one-way or two-way communication with the central unit. The data communication channel 9 may be a channel applying a data transmission method utilizing the signals of a standard video interface, e.g. as described in FI Patent Application 914435. In the embodiment of FIG. 2, the control unit 6 may, for instance, switch off the display unit on receiving a predetermined command from the central unit 11 via the communication channel 9.

A typical VGA adapter employs a 74LS125A type TTL circuit to generate the deflection signals HSYNC and VSYNC for the display unit. The driving capability of the TTL circuit is typically −2.6 mA in the logical state "1" and 24 mA in the logical state "0". Another display adapter employs a 74F125 type circuit having a higher driving capacity. The technical documentation of a 8514/A type display adapter specifies that the driving of the signals in the logical state "1" is 1.0 mA/2.7 V. The start-up circuit 7 has to be dimensioned for operation at these values. Therefore the circuit 7 uses components having as low power consumption as possible. For instance, the voltage up-converter 7A can be realized by a Linear Technology circuit LTC 1044.

Figure 4:
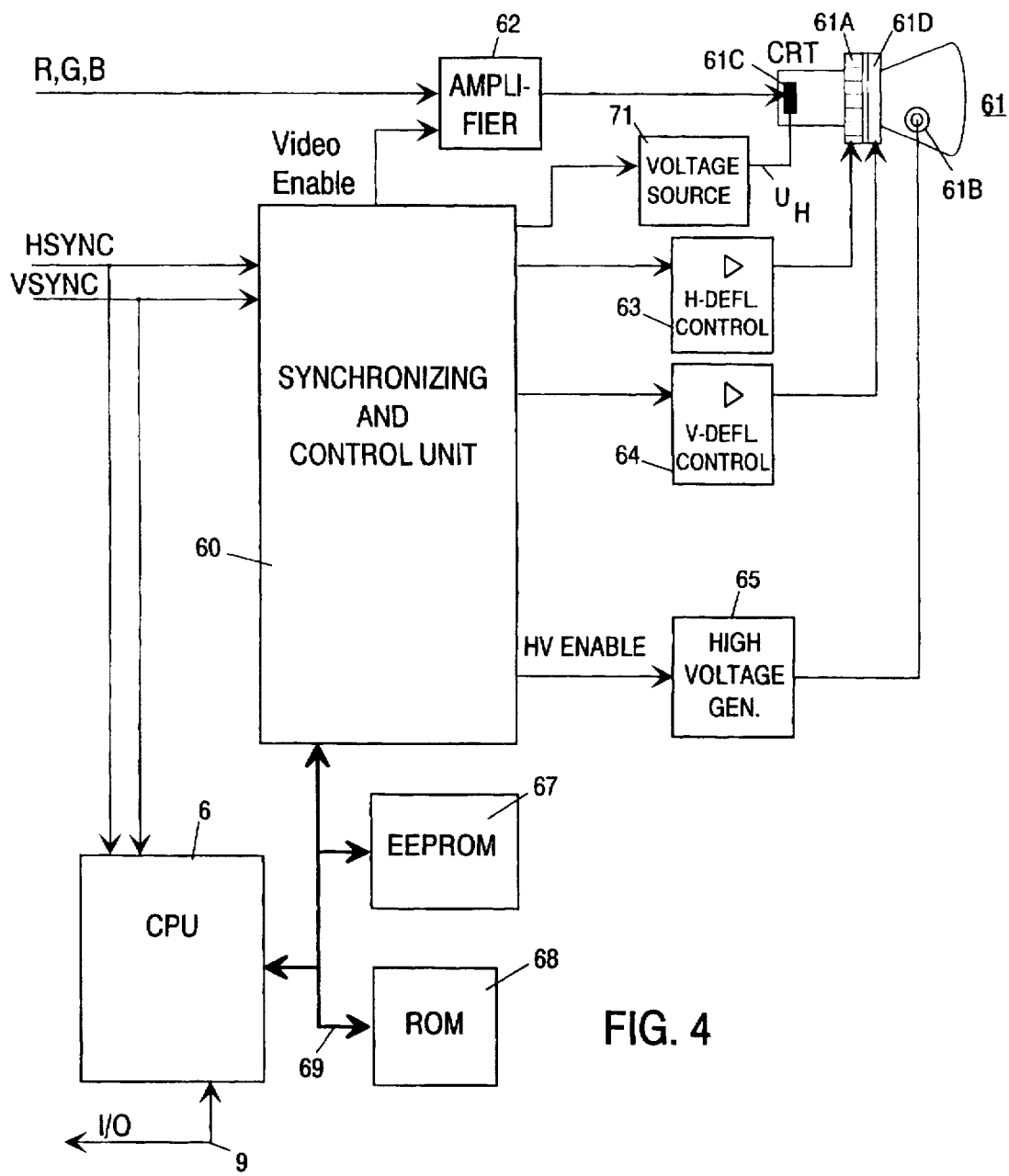
FIG. 4 is a block diagram illustrating control circuits for a cathode-ray tube.

The control unit 6 preferably controls the operations of the entire display unit, as shown in FIG. 4. Analog video signals R (red colour), G (green colour) and B (blue colour) are applied through a video amplifier unit 62 to heated cathode electrodes 61C in electron guns in the back portion of a cathode-ray tube 61. The electrodes 61C operating as a source of electron beams. The heating of the cathode electrode 61C is effected by a heating voltage $U_H$ supplied to the heating element of the cathode from a voltage source 71. An anode electrode 61B is in the front portion of the cathode-ray tube 61. A high-voltage generator 65 supplies a high voltage to the anode electrode for the acceleration of the electron beam. Between the cathode 61C and the anode 61B, i.e. in the neck portion of the cathode-ray tube 61, there is provided a deflection yoke comprising a horizontal deflection coil 61A and a vertical deflection coil 61D. The horizontal deflection coil 61A provides together with a horizontal deflection controller 63 a horizontal deflection circuit and generates a magnetic horizontal deflection field within the cathode-ray tube. Correspondingly, the vertical deflection coil 61D forms together with a vertical deflection controller a vertical deflection circuit and generates a magnetic vertical deflection field within the cathode-ray tube. A synchronizing and control unit 60 controls, in response to the deflection signals HSYNC and VSYNC, the vertical and horizontal deflection circuits, the horizontal deflection controller 63 and the vertical deflection controller 64, which in turn generate deflection currents in the horizontal and vertical deflection coils of the deflection yoke. The synchronizing and control unit 60 also enables or disables the operation of the video amplifier unit 62 and the high-voltage generator 65 by enable signals VIDEO_ENABLE and HV_ENABLE, respectively. In addition, the control unit 66 controls a voltage source 31. The control unit 60 is controlled over an address and data bus 69 by the control unit 6, to which an EEPROM memory 67 and a ROM memory 68 are also connected over the bus 69.

The control unit 6 operates so as to minimize the power consumption of the display unit and unnecessary generation of the magnetic and electric fields by turning off the deflection circuits and circuits of high power consumption whenever their operation is not needed.

In one embodiment of the invention, a control unit 76 monitors the behaviour of at least one signal it receives from the computer 11 via the video interface, such as the deflection signal, to detect the non-operative state of the computer controlling the display unit 10. The central unit 11 of the microcomputer may have a program for controlling the display adapter so as to provide the signals for the display unit, such as the deflection signals, with predetermined properties such as predetermined deflection frequencies or predetermined polarities or durations of the synchronizing pulses in the horizontal and vertical deflection signals. The control unit 6 performs display unit control procedures in accordance with such predetermined states of the deflection signals. The software required in the microcomputer 11 can be easily incorporated in the computer software controlling the safety and service life operations, e.g. in connection with the keyboard or system locking function, the screen save function, etc. In addition, the safety of the equipment is increased, as only the user has the authorization (password, smartcard or the like) to switch on the display. When the display is off, unauthorized reading of the state of the microcomputer 11 by interference radiation generated by the display is prevented.

The states of the deflection signals HSYNC and VSYNC can be used for controlling the control unit 6 e.g. in the following way. Switching off the microcomputer 11 sets the deflection signals HSYNC and VSYNC controlled by display adapter of the computer to a zero potential (the polarities correspond to the logical state (0,0)). In one embodiment of the invention the control unit 6 of the display unit, immediately or after a predetermined delay, e.g. 1 to 5 minutes, sets the display unit to an idle state in which the device is partly switched off or to a totally inoperative state. The control unit 6 may maintain the display unit in the idle state (which can be rapidly restored to an operative state) for a predetermined delay period of e.g. 1 to 2 hours after the last operation and then fully switch off the display. By means of the three other polarities of the deflection signals HSYNC and VSYNC [logical states (1,0), (0,1) and (1,1)], the microcomputer 11 could command the control unit 6 to set the display unit into different states, e.g. to reduce power consumption.

In the partly switched-off idle state the control unit 6 ceases the deflection of the cathoderay tube 61 by preventing the supply of energy from the deflection controllers 63 and 64 to the deflection circuit, so that no further energy is charged in the resonance circuit. The previously charged energy in the resonance circuit is gradually dissipated (power dissipations in the components) and the resonance circuit is inactivated, as a result of which the magnetic deflection fields are diminished to zero. As a consequence, no detrimental magnetic fields are created in the vicinity of the display unit when the display unit is in the non-active state. Concurrently the control unit 6 switches off the electron beam in order to prevent it from burning a spot in the phosphorus layer of the cathode-ray tube 61. The electron beam can be switched off e.g. from a control grid, by controlling the video amplifier, by reducing the anode voltage, or in some other way. To reduce the power consumption and the electric fields, the control unit may also inactivate the high-voltage generator 65 producing the anode voltage required to accelerate the electron beam. Similarly, all display unit circuits that are not necessary to a fast start-up of the display unit can be inoperative when the display unit is not in active use. It is, however, preferable that when the display unit is in the partly inoperative idle state, it can be restored into operation without delay, wherefore the display unit circuits necessary for the fast start-up of the display have to be maintained in operation. For this reason, it is preferable that the cathode 61C of the cathode-ray tube, for instance, which warms up relatively slowly, thus causing a delay in the displaying of the image on the screen, is kept warm by pulsing the cathode heating voltage or maintaining the heating voltage at a normal or reduced level during the idle state. The heating of the cathode 61C is preferably also maintained when the display unit is otherwise fully switched off, which substantially reduces the warming-up period of about 1 minute in the start-up of the display unit.

In the embodiment of FIG. 4, in place of or in addition to the functions described above, the control unit 6 may cause the display unit to assume different states, such as the above-mentioned idle state, in response to software commands from the computer via a data communication channel 9.

In the above-mentioned low-power modes of the display unit, the power switch 4 or the mechanical switch S1 is, of course, closed and the power supply 5 generates operating voltages for the equipment as usual.

The attached figures and the description related to them are only intended to illustrate the present invention. In its details the display unit according to the invention may vary within the spirit and scope of the attached claims.

I claim:

1. Video display unit comprising a built-in power supply;

at least one electrically controlled switch having an open and a closed state for controllably connecting a mains voltage to the power supply;

a control means responsive to the state of at least one video or deflection signal received by the display unit, for controlling said at least one switch to assume the open and closed state to turn the display unit off and on, respectively, no operating voltage being present in the control means when the switch is open; and a start-up and holding circuit responsive to at least one video or deflection signal to control said at least one switch to assume the closed state by the energy of said at least one video or deflection signal to which the start-up and holding circuit responds without additional sources of energy to activate the power supply and the control means.

2. Video display unit according to claim 1, where said start-up and holding circuit comprises a rectifier means for rectifying said at least one video or deflection signal to which the start-up and holding circuit responds; a charging means charged by said rectified signal; and a means for monitoring the level of charging of the charging means and generating a start-up current pulse from the energy charged in the charging means and supplying the pulse to said at least one switch when the level of charging of the charging means reaches a predetermined threshold level to activate the power supply and the control means so that the start-up and holding circuit generates a hold current for said at least one switch.

3. Video display unit according to claim 2, where the control means disables the operation of the start-up and holding circuit so that said at least one switch is closed after a predetermined period of time from the detection of a predetermined state of said at least one video or deflection signal to which the control means responds.

4. Video display unit according to claim 2, wherein the control means switches off display unit circuits having high power consumption and/or creating magnetic or electric fields while maintaining functions necessary for a fast start-up of the display unit, when said at least one video or deflection signal to which the control means responds is in a predetermined state.

5. Video display unit according to claim 2, where the control means switches off display unit circuits having high power consumption and/or creating magnetic or electric fields while maintaining functions necessary for fast start-up of the display unit, on receiving a predetermined command through a communication channel.

6. Video display unit according to claim 2, where the display unit comprises at least one low-voltage switch for controlling said control means, and said at least one low-voltage switch controls the control means so that the control means switches on or off the display unit, enables or disables the automatic switching on or of f, or enables or disables the turning off of display unit circuits having a high power consumption and/or creating electric or magnetic fields.

7. Video display unit according to claim 1 where the control means disables the operation of the start-up and holding circuit so that said at least one switch is closed after a predetermined period of time from the detection of a predetermined state of said at least one video or deflection signal to which the control means responds.

8. Video display unit according to claim 1 wherein the control means switches off display unit circuits having high power consumption and/or creating magnetic or electric fields while maintaining functions necessary for a fast start-up of the display unit, when said at least one video or deflection signal to which the control means responds is in a predetermined state.

9. Video display unit according to claim 8, wherein said predetermined state includes predetermined deflection frequencies and/or predetermined polarities and/or durations of the synchronizing pulses of the horizontal and/or vertical deflection signals.

10. Video display unit according to claim 1 wherein the control means switches off display unit circuits having high power consumption and/or creating magnetic or electric fields while maintaining functions necessary for fast start-up of the display unit, on receiving a predetermined command through a communication channel.

11. Video display unit according to claim 1 where the display unit comprises at least one lowvoltage switch for controlling said control means, and said at least one low-voltage switch controls the control means so that the control means switches on or off the display unit, enables or disables the automatic switching on or off, or enables or disables the turning off of display unit circuits having a high power consumption and/or creating electric or magnetic fields.

* * * * *

UNITED STATES PATENT AND TRADEMARK OFFICE
CERTIFICATE OF CORRECTION

PATENT NO. : 5,786,813
DATED : July 28, 1998
INVENTOR(S) : Jarmo KURIKKO

It is certified that error appears in the above-identified patent and that said Letters Patent is hereby corrected as shown below:

At col. 8, line 26, change "of f." to --off--.
At col. 8, line 54, change "lowvoltage" to --low voltage--.

Signed and Sealed this

Twenty-third Day of March, 1999

Attest:

Q. TODD DICKINSON

Attesting Officer     Acting Commissioner of Patents and Trademarks

UNITED STATES PATENT AND TRADEMARK OFFICE
CERTIFICATE OF CORRECTION

PATENT NO. : 5,786,813
DATED : July 28, 1998
INVENTOR(S) : Jarmo KURIKKO It is certified that error appears in the above-identified patent and that said Letters Patent is hereby corrected as shown below:

On the title page item [73] change "ICL Personal system OY" to --ICL Personal Systems Oy--.

Signed and Sealed this

Eighth Day of June, 1999

Attest:

Q. TODD DICKINSON

Attesting Officer

Acting Commissioner of Patents and Trademarks